United States Patent
Hoogendijk

(10) Patent No.: US 7,415,154 B2
(45) Date of Patent: Aug. 19, 2008

(54) COMPRESSION OF PALETTIZED COLOR IMAGES WITH VARIABLE LENGTH COLOR CODES

(75) Inventor: Paul Ferenc Hoogendijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 652 days.

(21) Appl. No.: 10/502,812

(22) PCT Filed: Jan. 23, 2003

(86) PCT No.: PCT/IB03/00218

§ 371 (c)(1), (2), (4) Date: Jul. 27, 2004

(87) PCT Pub. No.: WO03/065709

PCT Pub. Date: Aug. 7, 2003

(65) Prior Publication Data

US 2005/0152605 A1     Jul. 14, 2005

(30) Foreign Application Priority Data

Feb. 1, 2002    (EP) .................................. 02075430

(51) Int. Cl.
*G06K 9/00* (2006.01)
*G06K 9/36* (2006.01)
*G06K 9/46* (2006.01)

(52) U.S. Cl. ...................................... 382/166; 382/233
(58) Field of Classification Search ................. 382/162, 382/164, 166, 173, 209, 232, 233, 237, 245, 382/246; 341/63, 65
See application file for complete search history.

(56) References Cited

U.S. PATENT DOCUMENTS

| | | | |
|---|---|---|---|
| 4,228,467 A * | 10/1980 | de Loye et al. | 382/246 |
| 5,659,631 A | 8/1997 | Gormish et al. | |
| 6,549,666 B1 * | 4/2003 | Schwartz | 382/233 |
| 2005/0152605 A1 * | 7/2005 | Hoogendijk | 382/232 |

OTHER PUBLICATIONS

G.L.Landon; J. Rissanen;"Compression of Black and White Images With Arithmetic Coding", IEEE Transactions on Communications, vol. 29, No. 6, pp. 858-867, 2000.

* cited by examiner

*Primary Examiner*—Amir Alavi

(57) ABSTRACT

A color image (1) is compressed by associating a variable length color code with each color of the original colour image, and then forming bitplanes (51-54) each representing one bit position of the binary color codes for each pixel of the color image. The variable length codes are optimized, such as by a canonical Huffman algorithm. Compression is high, even for simple icons and special character images (e.g. 16×16 pixels). Decompression is simple, fast and resource inexpensive. Amongst many other uses, the image decompression is suitable for use in a cellular telephone having a color LCD display.

30 Claims, 8 Drawing Sheets

| Colour | Frequency | Code Length | Binary Colour Code |
|---|---|---|---|
| Q | 24 | 2 | 00 |
| X | 24 | 2 | 01 |
| A | 4 | 3 | 100 |
| Y | 4 | 3 | 101 |
| I | 4 | 3 | 110 |
| U | 4 | 3 | 111 |

02qx4ayiu — 31

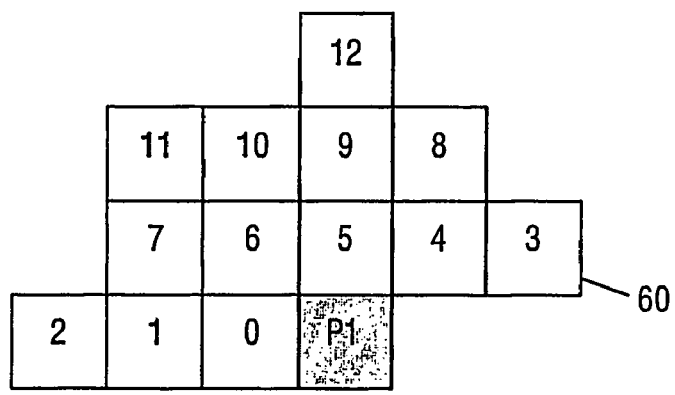
FIG.11
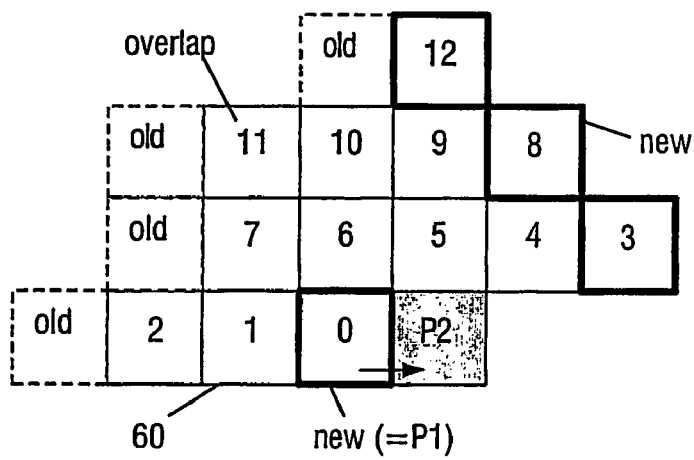
FIG.12
| | 51 | 53 | | | | | |
|---|---|---|---|---|---|---|---|
| pixel 1 | 0 | 1 | 0 | 1 0 1 0 1 |
| pixel 2 | 1 | 0 | 1 | 0 1 0 1 0 |
| pixel 3 | 1 | 1 | 1 | 1 0 1 0 1 |
FIG.13

COMPRESSION OF PALETTIZED COLOR IMAGES WITH VARIABLE LENGTH COLOR CODES

This application is a 371 of PCT/IB03/00218 filed on Jan. 23, 2003.

The present invention relates in general to a method and apparatus for compression of color images, to a compressed color image, and to a method and apparatus for decompression of color images.

An image is represented in a digitized form using a two-dimensional array of pixels. The size of the pixel array may vary from a very simple character or icon image having of the order of 16×16 pixels, to a large and detailed image having 1024×1024 (or more) pixels. For a bi-level image with only two color shades, such as black and white, each pixel can be represented by a single binary value. Color images on the other hand require 8 bits or even 24 bits per pixel in order to represent a desired range of colors, and therefore contain much more data than bi-level images. It is strongly desired to compress color images for efficient data transmission and data storage.

A wide variety of image compression techniques have been proposed, most of which are stream-oriented. These stream-oriented techniques are generally efficient where the image is relatively large and complex, but are generally not efficient when applied to a single simple icon or character image in isolation. Also, decompression tends to require relatively expensive resources.

Color images are employed in a wide variety of environments. One emerging area concerns portable communications devices such as cellular telephones, having a color display device such as a color LCD display screen. In devices of this type, system resources are constrained, particularly resources such as ROM, RAM and computing power. Firstly, it is desired to minimize the physical size of the device. Secondly, it is desired to minimize the cost of components of the device. Thirdly, it is desired to minimize power consumption. Fourthly, it is generally desirable to display an image relatively quickly, leading to a time constraint. Hence, there is a need for methods and apparatus for image compression and decompression which are applicable to an environment where system resources are constrained. It is particularly desired to provide a compressed image which can be decompressed by a decoder which is small, fast, uses a minimum of memory resources, and which is computationally inexpensive.

U.S. Pat. No. 5,659,631 (Ricoh) discloses a data compression system for color images which produces a set of color planes, optionally followed by a set of bitplanes. Each color plane and bitplane is a two-dimensional array of one-bit binary values, similar to a single bitplane for a bi-level image, which are then efficient to encode. However, this set of color planes and bitplanes does not provide optimal compression of the image, and decompression is still resource intensive.

An aim of the present invention is to provide methods and apparatus for compression and decompression of color images which address the problems of the prior art, whether mentioned above or otherwise. An aim of at least preferred embodiments of the present invention is to address compression of color images such that decompression is suitable for an environment where system resources are constrained, and to address decompression in such an environment. Another preferred aim is to provide efficient image compression and decompression of a simple icon or character image.

According to a first aspect of the present invention there is provided a method for compressing a color image, comprising the steps of: generating a plurality of bitplanes, each bitplane comprising a two dimensional array of binary values; and encoding the plurality of bitplanes; characterized by: forming a set of binary color codes according to colors of pixels in the color image, wherein the binary color codes are of variable length; and generating the plurality of bitplanes to represent respective bit positions of the variable length binary color codes applied to a color image.

In this method, preferably a variable length binary color code is formed for each color used in the color image to be compressed. The length allocated to each binary color code is optimized. Hence, some of the binary color codes will be shorter, which conveniently are used to represent those colors occurring most frequently in the color image, whilst others of the binary color codes are longer and conveniently represent those colors occurring less frequently in the color image.

In one embodiment, the variable length binary color code assigned to each color is determined by Huffman's algorithm and preferably a canonical Huffman algorithm. Hence, the variable length color code is optimized. In particular it is desired that colors with a high correlation in the original image are encoded using a set of variable length binary color codes that increase redundancy in the set of bitplanes.

In a preferred embodiment, the method comprises forming a first assignment of binary color codes and then successively trying alternative color coding assignments, until an optimum color coding is found that results in a smallest compressed image. Suitably, an optimum color coding assignment is found by the steps of (a) selecting a first tree shape for the variable length binary color codes and an initial assignment of colors to leaves, and forming a first compressed image version; (b) assessing an alternate leaf assignment by successively swapping a pair of leaves and forming successive compressed image versions, until an optimum leaf assignment is determined; and (c) assessing a set of alternate tree shapes by successively modifying the shape of the tree and repeating the step (b) of assessing alternate leaf assignments, thereby selecting an optimum tree shape from the set and an optimum leaf assignment.

Preferably, the method comprises forming a set of variable length color codes according to colors used in a plurality of starting color images. Here, control overhead is reduced by using the same color coding for each of a set of similar color images, such as a set of icons or special characters.

Preferably the method comprises dividing an original color image into a set of starting images, such as based on different areas of the original image, or different color components of the original image. For a large or highly detailed image, it may be more efficient to produce a different color coding for each area, leading to a smaller compressed image.

The variable length binary color codes are used to split the color image into the plurality of bitplanes. Each bitplane represents one bit position of the binary color codes, i.e. the variable length binary color codes are split bitwise to form the set of bitplanes. Suitably, the first generated bitplane represents binary values corresponding to the first bit position in each of the set of binary color codes. The second and subsequent bitplanes represent second and subsequent bit positions in the binary color code, respectively. Conveniently, where a bit position is not present in a particular binary color code (e.g. because that code is shorter than the current position being examined), then a hole is formed in a corresponding bit plane. These holes allow the size of the second or subsequent bitplanes to be substantially reduced.

The bitplanes are encoded by any suitable encoding scheme. Preferably, encoding of the bitplanes comprises the steps of context-modeling and entropy encoding. Preferably, the context-modeling is applied to a subset of the set of bitplanes according to a redetermined encoding depth, to produce a stream of encoded bits. Subsequent bitplanes are not encoded, and these unencoded bitplanes form a stream of unencoded bits. In another preferred embodiment, the set of bitplanes are divided into more than one group, and a different encoding scheme is applied to each group. For example, a simpler context modeling step using a smaller template is applied to a second group, and no encoding is applied to a third group. The groups can each be defined by encoding depths, to determine the maximum number of bitplanes in each subsequent group.

The invention also extends to a compressed color image signal produced by the method defined herein.

According to a second aspect of the present invention there is provided an image encoder for compressing a color image, comprising: a color coding unit arranged to associate variable length binary color codes with colors used in a original color image to be compressed; a bitplane generator for generating a set of bitplanes each representing one bit of the variable length binary color codes; and a bitplane encoding unit for encoding the generated set of bitplanes to form a compressed image.

According to a third aspect of the present invention there is provided a method for decompression of a compressed image, comprising the steps of: reading a color coding reference representing association of variable length binary color codes with colors of a compressed image; decoding one or more encoded bitplanes each representing one bit of the variable length binary color codes; determining the variable length binary color code for each pixel of the compressed color image; and replacing the variable length binary color code for each pixel with an associated color.

Preferably, decoding the encoded bitplanes comprises, for each pixel: decoding a bit value from one of the encoded bitplanes; and if the bit value resolves a binary color value then ignoring subsequent bitplanes, else decoding a bit value from a subsequent bitplane until the decoded bit values do resolve a binary color code or until a final encoded bitplane is reached.

Preferably, the variable length binary color code for each pixel is determined by combining bit positions taken from one or more of the encoded bitplanes and zero or more unencoded bitplanes, corresponding to that pixel position.

Preferably, decoding the encoded bitplanes comprises entropy decoding and context-modeling, wherein a template is used to define a set of pixels near a pixel being decoded, the template being a constant shape for all pixels in all of the encoded bitplanes.

Preferably, the context modeling comprises incrementally fetching context values as the template is moved from a first pixel position (P1) to a second pixel position (P2), by retaining context values of the first pixel position that overlap with the second pixel position.

Preferably, decoding of the bitplanes and determining the variable length binary color code for each pixel, comprises forming a byte array where, for each pixel, a set of bitplanes for that pixel are stored in a single byte (or other length memory location) in descending (or ascending) bit order.

According to a fourth aspect of the present invention there is provided an image decoder arranged to decompress a compressed color image, the image decoder comprising: a color decoding unit arranged allocate a color to each pixel of a decompressed image according to a set of variable length binary color codes; a bitplane accumulator for generating the binary color codes from a plurality of bitplanes; and a bitplane decoding unit for decoding and reforming a set of encoded bitplanes from a compressed image.

The present invention also extends to an apparatus incorporating the image decoder and/or the image encoder. The apparatus may include, but is not restricted to, a display apparatus such as a television, a media reproduction device such as a video cassette recorder or digital video disk player, an image processing system such as a printer, a scanner, a camera, or a video camera, a general purpose computing device such as a palm top computer, or a telecommunications apparatus such as a cellular telephone. This list is not exhaustive, and the invention is applicable to a wide variety of practical apparatus. The invention is particularly applicable where system resources of the apparatus are constricted.

For a better understanding of the invention, and to show how embodiments of the same may be carried into effect, reference will now be made, by way of example, to the accompanying diagrammatic drawings in which:

FIG. 11 shows an example template employed during context modeling of a bitplane;

FIG. 12 shows the example template moved between first and second pixel positions; and FIG. 13 shows a preferred data storage layout for use during decompression of a compressed color image.

Figure 1:
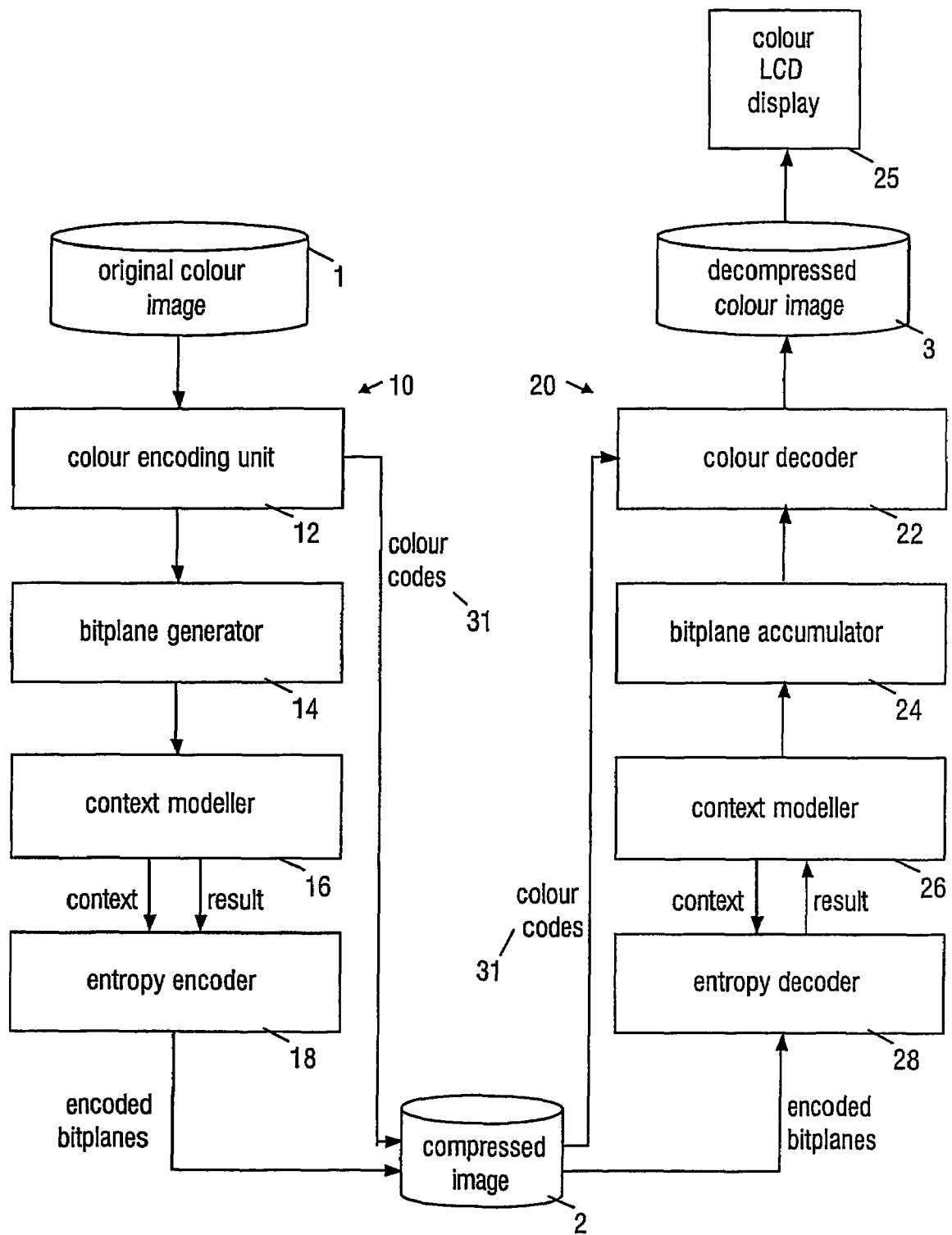
FIG. 1 is a schematic block diagram of a preferred apparatus for compression and decompression of color images.

FIG. 1 is a schematic block diagram of a preferred apparatus for compression of color images, and a preferred apparatus for decompression of color images. An original image 1 is compressed by an image encoder 10 to form a compressed image 2. The compressed image 2 is stored or transmitted as desired. Later, the compressed image 2 is decompressed by an image decoder 20, to form a decompressed image 3. Here, it is desirable that the decompressed image 3 faithfully reconstructs the original image 1, i.e. that the compression and decompression are lossless.

The image encoder 10 comprises a color coding unit 12 arranged to form binary color codes associated with a set of colors employed in the original image 1, a bitplane generator 14 for generating a set of bitplanes from the binary color codes, and a bitplane encoding unit comprising a context modeler 16 and a bitplane encoder 18 for encoding the generated bitplanes to form the compressed image 2.

The image decoder 20 comprises a color decoding unit 22 arranged to allocate color values per pixel of a decompressed image 3 from a set of binary color codes, a bitplane accumulator 24 for generating the binary color codes from a set of bitplanes, and a bitplane decoding unit comprising a context modeler 26 and a bitplane decoder 28 for decoding a set of bitplanes from a compressed image 2.

In the preferred embodiment, the image encoder 10 and the image decoder 20 are provided in physically separate device platforms, although it is possible that a single device is adapted to perform both compression and decompression functions. As one preferred example, the image encoder 10 is conveniently provided in a general purpose computing platform, whilst the image decoder 20 is conveniently embedded in a cellular telecommunications device. The image decoder 20 is arranged to receive compressed images 2 such as from a memory store (not shown), and to pass decompressed images 3 to a display 25, such as a 256 color LCD display. Here, it will be appreciated that system resources, such as time, memory and computing power, available to the image decoder 20 are constricted by the nature of the device in which the image decoder operates.

Figure 2:
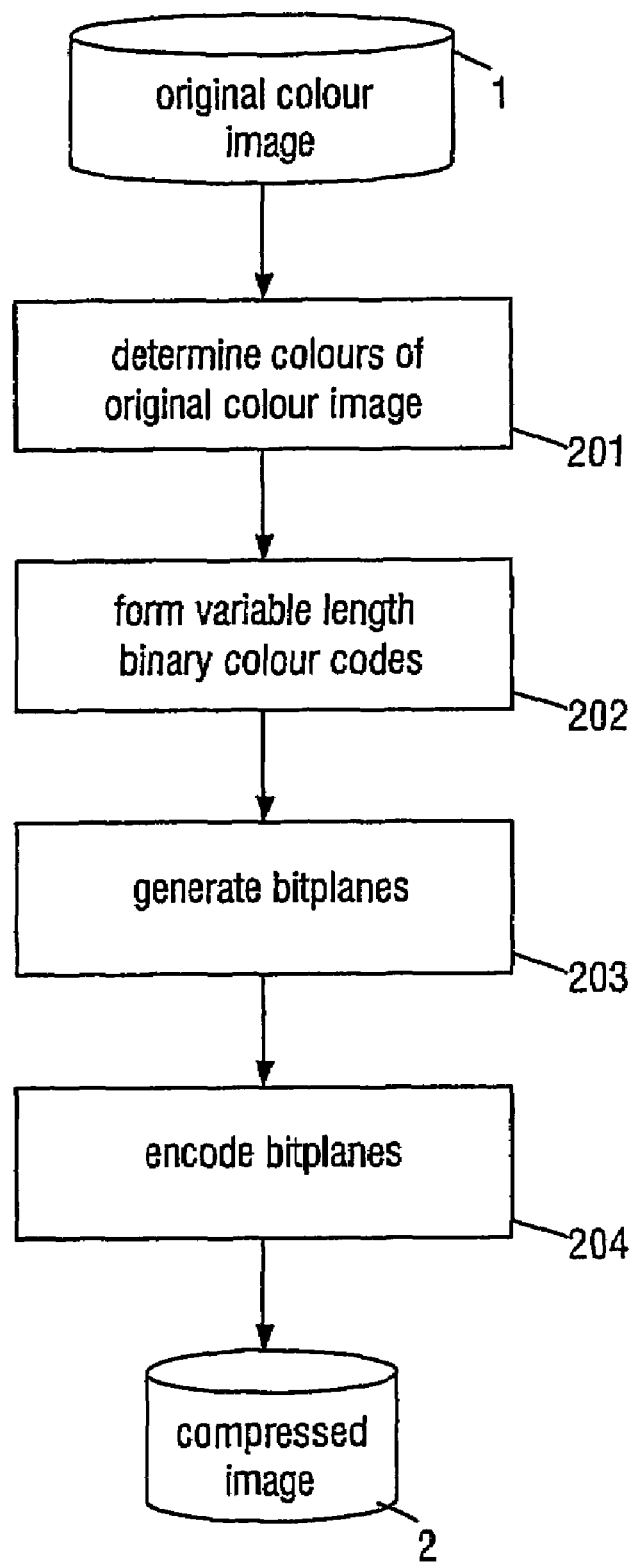
FIG. 2 is a schematic overview of a preferred method for compression of a color image.

FIG. 2 is a schematic overview of a preferred method for compression of a color image. The function and operation of the image encoder 10 will now be described in more detail, with reference to the method of FIG. 2.

The original color image 1 is assumed to contain more than two colors, although compression and decompression of bi-level images is not excluded. Both bi-level and color images may be processed by the same apparatus and method, in which case a bi-level images is treated as a simple form of a color image. The color (or shade) of each pixel in the original image is defined by an explicit representation of the color of that pixel, or with a reference to a full pallet of colors (e.g. 8 bit or 24 bit color). The original image 1 can be received in any suitable format which allows a color for each pixel to be calculated or otherwise determined.

As a preliminary step, it may be necessary to limit colors of the original image 1 to a predetermined pallet that can be displayed by a known display device, such as a pallet of 256 colors that a known color LCD display 25 is capable of producing. Conveniently, when a color of the original color image is not available in the display pallet, then a closest match is chosen. Thus, a starting color image is formed ready to be compressed.

In FIG. 2, step 201 comprises determining a set of colors which are used in the starting color image 1. Step 201 also comprises determining a frequency pixel area) of each color. In practice, the set of colors used in any one image are only a small subset of the available color pallet, such as only 5 or 10 or 20 colors out of a display pallet of 256 colors. Hence, it is convenient to perform image compression on the basis the colors used in a particular color image, and to make a separate note of each of the used colors.

Step 202 comprises forming a set of variable length binary color codes representing the set of colors used in the starting color image. The length of the binary color code allocated to each color is selected in order to optimize entropy in the color image. Steps 201 and 202 are conveniently performed by the color coding unit 12.

Knowledge of the set of variable length binary color codes which have been formed for this image will be required later during decompression. A definition of the color code structure and the corresponding real colors is stored at the beginning of the compressed color image 3, as a color coding reference 31.

Step 203 comprises generating a plurality of bitplanes, derived from the variable length binary color code of each pixel, in the bitplane generator 14. Conveniently, a full bit plane is derived at least for a first bit position, which is common to all of the variable length binary color codes. Second and subsequent bitplanes may contain holes, where a shorter variable length binary color code has no value in that bit position. Hence, successive bitplanes tend to get progressively smaller, because longer binary color codes tend to be used for the less frequently occurring colors of the color image.

Step 204 comprises encoding the generated bitplanes. Briefly, step 204 comprises context-modeling the bitplanes in the context modeler 16, and then entropy encoding in the entropy encoder 18. Techniques for efficiently encoding a set of bitplanes are known and will not be described here in detail. As one example, see "Compression of Black and White Images with Arithmetic Coding", G. L. Langdon and J. Rissanen, IEEE Transactions on Communications, Vol. 29, No 6, pp 858-867. This reference discusses techniques for encoding a bitplane of a bi-level (black and white) image using either static or adaptive context modeling and arithmetic encoding. The referenced technique is suitably applied to each of the set of bitplanes, to produce encoded data for the compressed image 2. There are many other options for context-modeling and entropy encoding the set of bitplanes.

To illustrate the image compression method and apparatus of the present invention in more detail, reference will now be made to a simplified example as shown in FIGS. 3 to 7.

Figure 3:
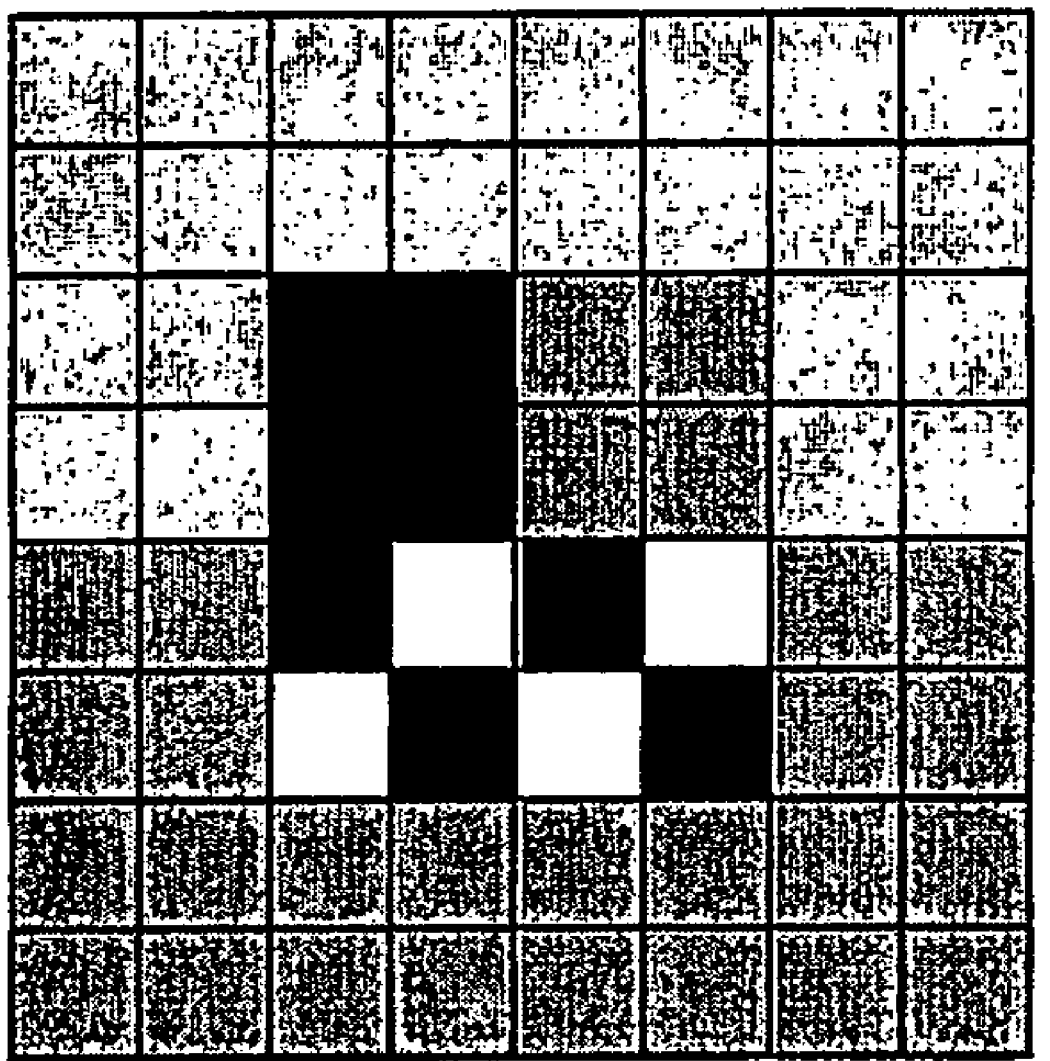
FIG. 3 shows an example color image.

FIG. 3 shows a simple color image in the form of an 8×8 pixel icon. In a more practical embodiment, the color image is an icon, or a special character such as a Chinese language character, represented by pixel array of the order of 15×15 or 16×16 or 28×28 pixels. The pixel array can be any size, and need not be square.

In this example, each pixel has one of 256 colors, represented by an 8 bit color value. The original color image of FIG. 3 has six colors (or greyscale tones), which can be represented by six symbols A,I,Q,U,X & Y as shown in FIG. 4, representing six colors from a predetermined display pallet.

Figures 4, 5, 6:
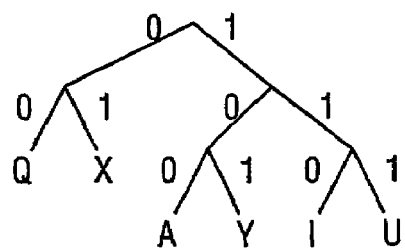
FIG. 4 shows color codes allocated to the example color image of FIG. 3.
FIG. 5 is a table showing a frequency of occurrence of each color within the example color image.
FIG. 6 is an example binary tree representation of binary color codes.

FIG. 5 is a table showing a frequency of occurrence of each color within the example color image. Conveniently, this frequency occurrence is used to determine an efficient binary color code for each color. Here, it will be seen that colors Q and X occur most frequently, and so are given a shorter length code than colors A, Y, I and U. In this example, the binary color codes for colors Q and X are 2 bits long, while the codes for the four other colors A, Y, I and U are 3 bits long.

FIG. 6 is a binary tree representation of the binary color codes of FIG. 5. This is a canonical tree, because all leaves at each depth are located as far as possible to the left. This binary tree representation is used to form the color coding reference 31, by describing the number of leaves at each depth, and the color defined by those leaves.

Figures 7, 8:
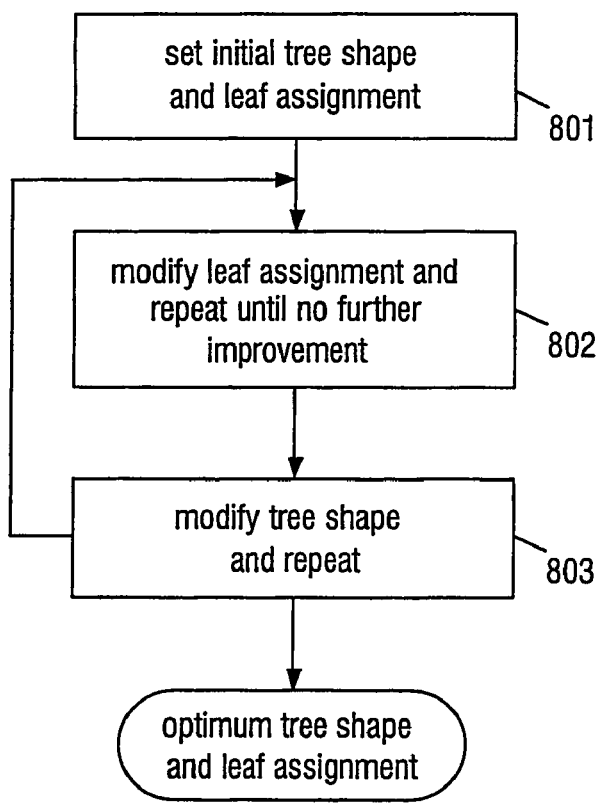
FIG. 7 shows example bitplanes.
FIG. 8 is a schematic overview of a preferred method for optimizing assignment of variable length binary color codes.

FIG. 7 shows three bitplanes 51, 52 and 53 which have been derived from the variable length binary color codes shown in FIG. 5 as applied to the example color image of FIGS. 3 and 4. Context-modeling and entropy encoding are applied to these three bitplanes 51, 52 and 53 to form the compressed image 2.

The first bit plane 51 corresponds to a first (leftmost) bit position of the binary color codes. This first bit position is shared by all of the variable length binary color codes, and so the first bit plane 51 is a full bit plane with one bit corresponding to each pixel of the color image.

The second bit plane 52 is derived from the second bit position of the binary color codes. Again, a fill bit plane is formed because all of the binary color codes include the second bit position.

The third bit plane 53 represents the third bit position of the binary color codes. Here, the codes for the colors Q and X are shorter than this bit position, and so the third bit plane 53 contains holes, denoted by a dot, at pixel positions corresponding to the colors Q and X. These holes need not be encoded because, during decoding, information from the first and second bitplanes 51 and 52, and in general previous decoded bitplanes, is used to reconstruct the holes. Hence, the third bit plane 53 is a partial bit plane, containing fewer data positions than the complete array of the color image. In this example the maximum length of the binary color code is three bits, and so three bitplanes 51, 52 and 53 are generated. In general, one bit plane is generated for each bit position of the longest of the set of binary color codes, and for those binary color codes shorter than this maximum length, holes will appear in at least one of the bitplanes.

In a first preferred embodiment, a variable length binary code for each color is determined by Huffman's algorithm, and preferably a canonical Huffman algorithm, according to the area size of each color within the color image (i.e. the number of pixels having that color as a fraction of the total number of pixels in the image). As a result, colors which are used frequently in the image are given a relatively short length code, whilst colors which are used relatively infrequently are given a longer length code.

The example bitplanes shown in FIG. 7 illustrate the advantage of choosing an optimal set of binary color codes. The first two bitplanes 51, 52 each contain conveniently shaped rectangles of "1"s and "0"s, and these patterns generally allow efficient coding of each bit plane. This example also illustrates that applying optimal varying length encoding using Huffman's algorithm assumes that the area size of each color is proportional to the encoding efficiency. Sometimes, this is not the case, as illustrated by the checkerboard pattern of colors I and U.

Hence, in a second embodiment, it is desired to select an optimal the variable length binary color code used to represent each color, such that a smallest or more efficient compressed image is achieved. In this second embodiment, the step 202 comprises improving a first, naive, assignment of binary color codes by successively trying alternative color coding assignments, until an optimum color coding is found.

FIG. 8 is a schematic overview of a preferred method for optimizing assignment of variable length binary color codes in the image encoder 10, as used in this second embodiment.

In step 801, an arbitrary tree shape is determined and an initial assignment of colors to leaves is made, such as by applying a canonical Huffman algorithm or other method as discussed above. An first version of the compressed image is formed, using the first assignment.

In step 802, a pair of leaves are swapped and the encoding repeated. The swapped pair of leaves can be at the same level of the tree, or at different levels. If the resulting compressed image is smaller, then the new assignment is held, otherwise the previous assignment is restored. Step 802 is repeated for each pair of leaves, until no further improvement can be made for this tree shape.

Step 803 comprises modifying the shape of the tree, and then repeating step 802 for the new tree shape. Preferably, step 803 comprises morphing the tree shape through a predetermined set of shapes. Referring to the frequency occurrence table in FIG. 5, let the sum of all the occurrence counts (i.e. total number of pixels) be t, and let p be an integer variable in a predetermined range $p_{min}$ to $p_{max}$, e.g. between 0 and 10. A modifier of $(t*p)/p_{max}$ is added to each occurrence count, to provide a modified occurrence count. Where p=0, then a normal Huffman tree is determined. As p increases towards $P_{max}$, then the modified occurrence count levels out frequency differences between colors and the tree shape changes toward a full binary tree. Each tree shape is considered in turn, and a tree shape that results in a smallest compressed image is selected. In this way, an optimum tree shape and assignment is determined, specific to the image (or images) under consideration.

It is preferable to form the binary color codes using plural sets of Gray codes. One set of Gray codes are determined for each length of the variable length binary color codes. For example, a first set of Gray codes are determined for the binary color codes of length 2 bits, and a second set of Gray codes are determined for the binary color codes of length 3 bits, and so on. Gray codes are particularly useful where the colors of the image are related, such as where the image is a greyscale image. A Gray code represents each number in a sequence of integers $\{0 \ldots 2^N-1\}$ as a binary string of length N in an order such that adjacent integers have Gray code representations that differ in only one bit position. Progression through the integer sequence therefore requires flipping just one bit at a time.

Where the original color image 1 contains many colors, e.g. a 24-bit color image using say 500 different colors, then preferably the original image is separated into a set of starting images. It is convenient to separate the R, G and B color components of the original image as separate greyscale images. The R, G and B greyscale images are then compressed separately using the methods discussed herein, i.e. forming encoded bitplanes for the R image, then for the G image, and then for the B image, which are provided in sequence as the compressed image 2. During decoding, the separated R, G and B color components are each decompressed and then recombined.

As another option, a set of starting images are produced each representing different area portions of a very large or very detailed original image 1. Each of the set of smaller or simpler starting images is then compressed separately as discussed herein.

Where a set of very simple starting images are to be compressed, such as a set of special characters or icons, then overhead such as the color coding reference 31 is preferably shared amongst plural images. Here, the color coding reference 31 is determined for the set of starting images, and is applied to each image in the set.

Figure 9:
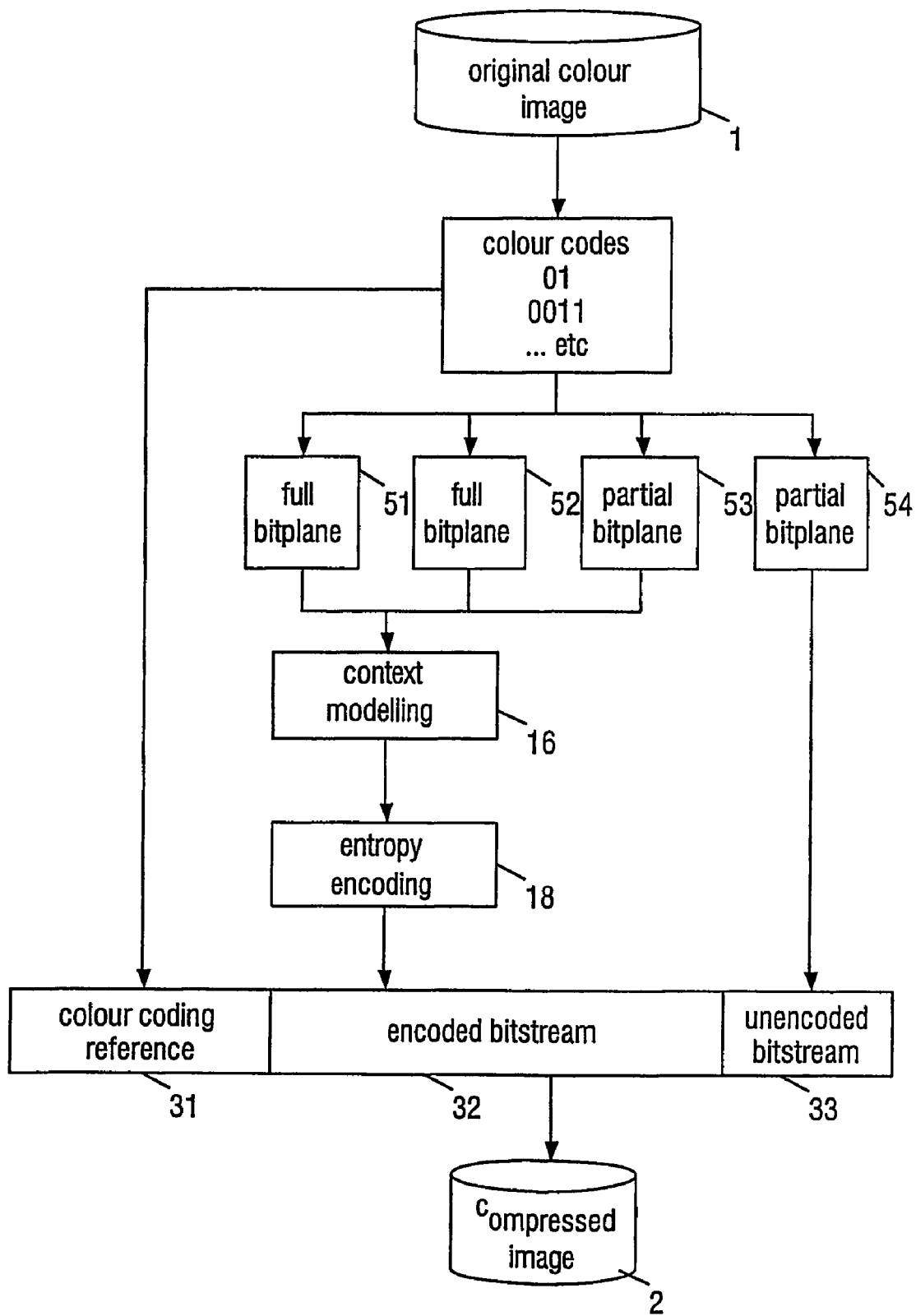
FIG. 9 is a schematic diagram showing data flow during compression and decompression.

FIG. 9 is a schematic representation of data flow in the encoder 10 to produce the compressed image 2. The data flow during decompression is a reverse of the flow in FIG. 9.

As mentioned above, the assignment of the variable length color codes and the colors they represent are stored as a color coding reference 31. The variable length binary color codes are used to generate a plurality of bitplanes, of which four bitplanes 51, 52, 53 and 54 are shown in FIG. 9.

At least some of the bitplanes, in this case bitplanes 51, 52 and 53, are encoded such as by applying context-modeling and entropy encoding, to form a stream of encoded bits 32. Different levels of encoding may be applied to different groups of bitplanes. In a simple embodiment, a first group of bitplanes are encoded, whilst a second group are left unencoded or are subject to a simpler encoding. A first n bitplanes form the first group and n+1-th and subsequent bitplanes form the second group, where n is a predetermined integer. Further groups and encoding variations may be similarly defined.

The context-modeling performed by the context modeler 16 employs a context referring to at least one pixel near a pixel being coded (the context including pixels in this bitplane or optionally in other bitplanes). Preferably, the context is derived by a template selecting a set of pixels near a pixel being encoded, the set having a predetermined shape. Conveniently, the binary value that is returned by applying the template forms an index of a table which predicts a probability of the pixel being encoded having a binary value of "1" or "0". This prediction is compared against the actual value of the pixel being encoded, and a difference calculated. If the difference is zero (i.e. the prediction was correct) then the pixel position being encoded in this bitplane is given a value of "0", or else the pixel position is given a value of "1" (i.e. when the prediction is not correct). This context modeling substantially decreases entropy in each bitplane, by forming a bitplane with many 0s and few 1s. Therefore, efficiency of entropy encoding is improved. The entropy encoder 18 suitably comprises a plurality of canonical Huffman coders, for performing the entropy encoding. The context value also determines the coder to be used for this pixel. In practical embodiments of the invention, context modeling produces long runs of "0"s with infrequent "1"s. Hence, the entropy encoding is conveniently run length (RL) coding, representing the length of runs of "0"s.

The later bitplanes, such as bitplane 54, tend to contain many holes, and context modeling does not significantly improve coherence of the data values. The number of bitplanes to be encoded is set to a predetermined depth. Context modeling is applied up to the specified depth. Subsequent bitplanes are not context-modeled or encoded, and the zero or more unencoded bitplanes are stored directly as a stream of unencoded symbols 33.

As one option, the bitplanes 51, 52, 53 are each encoded separately in sequence. However, in the preferred embodiment streams of symbols are interleaved, from within each bitplane and/or from separate bitplanes. This is done by simulating the decoder. The order in which the decoder will call different Huffman decoders for run-length decoding the encoded bitplane streams is used to interleave the separate streams.

Figure 10:
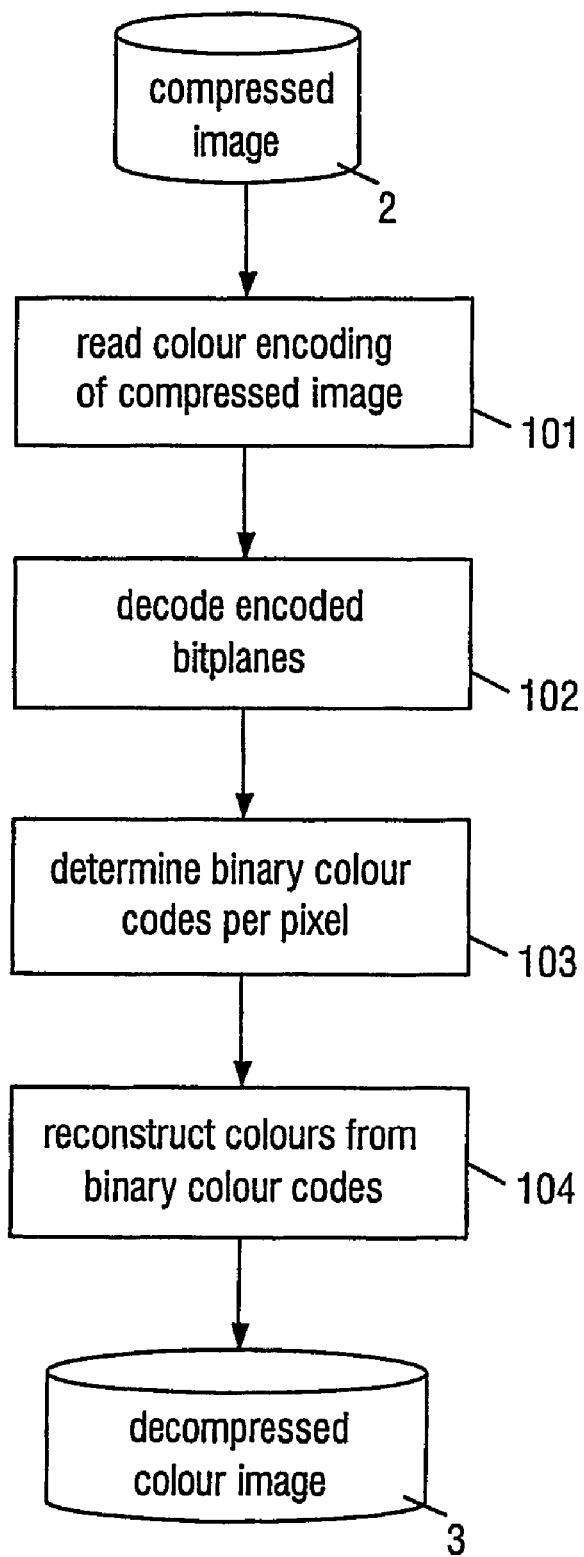
FIG. 10 is a schematic overview of a preferred method for decompression of a color image.

FIG. 10 is an overview of a preferred method for decompression of the compressed image 2.

Step 101 comprises reading a color coding 31 of the compressed color image, representing assignment of variable length binary color codes and the associated colors.

Step 102 comprises decoding the plurality of bitplanes, such as by entropy decoding and context modeling in the entropy decoder 28 and the context modeler 26. For a first pixel, the first bit of the first bit plane is reconstructed. If this bit already encodes a color, i.e. because the color was encoded with a single bit variable length binary color code, then a color can be determined for that first pixel and further bitplanes are ignored, because the subsequent bitplanes will contain holes at the position of the pixel being decoded. If, on the other hand, the bit taken from the first bit plane does not encode a color, then bits of one or more further encoded bitplanes are reconstructed until the bits do encode a color or until the final encoded depth is reached. The next pixel is then decoded in turn, with reference to the relevant one or more encoded bitplanes that contribute bits to the binary color code for the color of that pixel.

Since the bit values for a binary color code of a pixel will be used as the context of later pixels, preferably the decoded bit values are maintained until all of the pixels in the array have been decoded.

In step 103, the colors of each pixel are reconstructed. Here, the binary color code is obtained by combining bit positions taken from one or more of the decoded bitplanes, and any unencoded bitplanes, corresponding to that pixel position. For a first pixel, if the decoded bitplanes provide the complete binary color code of that pixel then the binary color code is determined. If the more bits are needed, then those bits are fetched from the stream of unencoded bitplanes until a binary color code for that pixel is complete.

In step 104, the binary color code for each pixel is replaced by the associated original color value. The pixel array then forms the output of the decoder as the decompressed image 3.

During context modeling, a template is used to define a set of pixels near a pixel being decoded. Ideally, the template is a constant shape for all pixels in all of the encoded bitplanes. This constant shape template allows the decoder to be simplified. FIG. 11 shows an example template 60, in this case covering thirteen pixels 0 to 12 near a current pixel P1. Any suitable size and shape of template can be employed. Where part of the template falls outside the pixel array, then by convention a value of "o" is used.

FIG. 12 shows the example template 60 in first and second positions. As the template is moved from a first pixel position P1 to examine a new second pixel P2, an incremental fetch is performed of only new context values of the new position. In this case, only context values for neighboring pixels 0, 3, 8 and 12 require fetching. Other context values that overlap between the first and second pixel position are retained and used again in the second position. In this example, the previously determined pixel P1 forms position 0 in the template for pixel P2. This incremental fetch substantially reduces the amount of new data required by the context modeler at each pixel position.

FIG. 13 shows a preferred data storage arrangement used during decoding. For reconstruction of the bitplanes, a decoded bitplane array is formed that will subsequently form an output pixel array from the decoder. At each pixel, the bit of a first decoded bitplane 51 is stored in a first bit position of the array location for that pixel. Subsequent decoded bitplanes are stored at subsequent bit positions in the same location. That is, for each pixel, the set of bitplanes for that pixel are stored in a single location in descending (or ascending) bit order. Hence, reading a single array location allows data from a complete set of bitplanes to be determined, thereby improving speed and reducing memory access in the decoder. As one example, FIG. 13 shows an array where each location is an 8-bit byte, allowing up to 8 bitplanes to be stored. Other length locations can be used in the bitplane array, as desired.

A method and apparatus for compression of color images have been described, which provide efficient image compression even for relatively small and simple isolated images. Decompression of the compressed image is simple and inexpensive. A method and apparatus for decompression of color images have been described which are suitable for operation in an environment where system resources are constrained. Other features and advantages will be apparent from the foregoing description and through practice of the invention.

It is noted that the decoder implementations described in this application are also applicable outside the scope of the current invention and can be regarded as inventions themselves. It is in particular possible to apply the decoder implementations for decoding compressed images, wherein the binary color codes are of fixed length such as the compressed images as encoded according to U.S. Pat. No. 5,659,631.

Advantageous decoding of compressed images having fixed length binary color codes comprises: reading a color coding reference representing association of binary color codes with colors of a compressed image; decoding one or more encoded bitplanes each representing one bit of the binary color codes; determining the binary color code for each pixel of the compressed color image; and replacing the binary color code for each pixel with an associated color, wherein the decoding comprises, for each pixel: determining the binary color code for each pixel by combining bit positions taken from one or more of the encoded bitplanes and zero or more unencoded bitplanes, corresponding to that pixel position. The decoding preferably comprises entropy-decoding and context-modeling, wherein a template is used to define a set of pixels near a pixel being decoded, the template being a constant shape for all pixels in all of the encoded bitplanes. Preferably, the decoding comprises incrementally fetching context values as the template is moved from a first pixel position to a second pixel position, by retaining context values of the first pixel position that overlap with the second position. Preferably, the decoding of the bitplanes and determining the binary color code for each pixel comprises forming a pixel array where, for each pixel, a set of decoded bitplanes for that pixels are stored in a single location in a predetermined bit order.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for compressing a color image, comprising:
   generating a plurality of bitplanes, each bitplane comprising a two-dimensional array of binary values; and
   encoding the plurality of bitplanes; and
   forming a set of variable length binary color codes according to colors of pixels in the color image, wherein
   the plurality of bitplanes are generated to represent respective bit positions of the variable length binary color codes applied to a color image.

2. The method of claim 1, comprising assigning the variable length binary color codes to colors used in the color image with reference to a frequency of occurrence of each color.

3. The method of claim 1, wherein the variable length binary code assigned to each color is determined by Huffman's algorithm.

4. The method of claim 1, wherein the variable length binary color code assigned to each color is determined by a canonical Huffman algorithm.

5. The method of claim 1, wherein a set of Gray codes are determined for at least one length of the variable length binary color codes.

6. The method of claim 1, comprising forming a first assignment of binary color codes and then successively trying alternative color coding assignments, until an optimum color coding is found that results in a smallest compressed image.

7. The method of claim 1, comprising:
   selecting a first tree shape for the variable length binary color codes and an initial assignment of colors to leaves, and forming a first compressed image version;
   assessing an alternate leaf assignment by successively swapping a pair of leaves and forming successive compressed image versions, until an optimum leaf assignment is determined; and
   assessing a set of alternate tree shapes by successively modifying the shape of the tree and repeating the assessing alternate leaf assignments, thereby selecting an optimum tree shape and an optimum leaf assignment.

8. The method of claim 7, wherein the assessing a set of alternate tree shapes comprises forming each of the set of alternate tree shapes by successively morphing the tree shape.

9. The method of claim 1, comprising forming a color coding reference defining a tree structure of the binary color codes and defining an association of the binary color codes with colors used in the color image.

10. The method of claim 1, comprising forming the variable length color codes according to colors used in a plurality of starting color images.

11. The method of claim 1, comprising dividing an original color image into a set of starting images.

12. The method of claim 1, wherein each bitplane represents one bit position in the set of variable length binary color codes.

13. The method of claim 12, wherein a first generated bit plane represents binary values corresponding to a first bit position in each of the set of binary color codes, and a second and subsequent bitplanes each represent second and subsequent bit positions in the binary color code, respectively.

14. The method of claim 12, comprising forming a hole in one or more of the bitplanes, where a bit position is not present in any particular one of the set of variable length binary color codes.

15. The method of claim 1, wherein encoding of the bitplanes comprises context-modeling and entropy encoding.

16. The method of claim 15, comprising encoding at least a first group of the bitplanes, while zero or more subsequent bitplanes are not encoded.

17. The method of claim 15, comprising dividing the bitplanes into at least two groups, and encoding each group of bitplanes with an encoding scheme for that group.

18. The method of claim 16, comprising interleaving encoded symbols from the encoded bitplanes with reference to an order required for decoding.

19. A compressed color image signal formed by the method of claim 1.

20. An image encoder for compressing a color image, comprising:
   a color coding unit arranged to associate variable length binary color codes with colors used in an original color image to be compressed;
   a bitplane generator for generating a set of bitplanes from the binary color codes; and
   a bitplane encoding unit for encoding the generated bitplanes to form a compressed image.

21. An image compression system, comprising:
   an image encoder as set forth in claim 20.

22. A method for decompression of a compressed image, comprising:
   reading a color coding reference representing association of variable length binary color codes with colors of a compressed image;
   decoding one or more encoded bitplanes each representing one bit of the variable length binary color codes;
   determining the variable length binary color code for each pixel of the compressed color image; and
   replacing the variable length binary color code for each pixel with an associated color.

23. The method of claim 22, wherein decoding the encoded bitplanes comprises, for each pixel:
   decoding a bit value from one of the encoded bitplanes; and
   if the bit value resolves a binary color value then ignoring subsequent bitplanes, else decoding a bit value from a subsequent bitplane until the decoded bit values do resolve a binary color code or until a final encoded bitplane is reached.

24. The method of claim 22, wherein the variable length binary color code for each pixel is determined by combining bit positions taken from one or more of the encoded bitplanes and zero or more unencoded bitplanes, corresponding to that pixel position.

25. The method of claim 22, wherein decoding the encoded bitplanes comprises entropy decoding and context-modeling, wherein a template is used to define a set of pixels near a pixel being decoded, the template being a constant shape for all pixels in all of the encoded bitplanes.

26. The method of claim 25, comprising incrementally fetching context values as the template is moved from a first pixel position to a second pixel position, by retaining context values of the first pixel position that overlap with the second pixel position.

27. The method of claim 22, wherein decoding of the bitplanes and determining the variable length binary color code for each pixel comprises forming a pixel array where, for each pixel, a set of decoded bitplanes for that pixel are stored in a single location in a predetermined bit order.

28. An image decoder arranged to decompress a compressed color image, the image decoder comprising:
 a color decoding unit arranged to allocate a color to each pixel of a decompressed image according to a set of variable length binary color codes;
 a bitplane accumulator for generating the binary color codes from a plurality of bitplanes; and
 a bitplane decoding unit for decoding and reforming a set of encoded bitplanes from a compressed image.

29. An image display device, comprising:
 a store for storing a compressed color image;
 an image decoder for decompressing the compressed color image to form a decompressed color image, the image decoder being arranged as set forth in claim 28; and
 a color display for displaying the decompressed color image.

30. The image display device of claim 29, wherein the device is a cellular telephony device.

* * * * *